United States Patent
Nakayama et al.

(10) Patent No.: US 9,062,587 B2
(45) Date of Patent: Jun. 23, 2015

(54) EXHAUST PIPE CONNECTING STRUCTURE

(75) Inventors: Koichi Nakayama, Shizuoka (JP);
Toshio Suzuki, Shizuoka (JP); Katsumi Ochiai, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 13/460,855

(22) Filed: May 1, 2012

(65) Prior Publication Data

US 2013/0062878 A1    Mar. 14, 2013

(30) Foreign Application Priority Data

Sep. 8, 2011    (JP) .................................. 2011-196211

(51) Int. Cl.
| | | |
|---|---|---|
| F16L 17/00 | (2006.01) | |
| F01N 13/00 | (2010.01) | |
| F16L 39/00 | (2006.01) | |
| F01N 13/10 | (2010.01) | |
| F01N 13/14 | (2010.01) | |
| F01N 13/18 | (2010.01) | |
| F16L 21/05 | (2006.01) | |

(52) U.S. Cl.
CPC .................. *F01N 13/00* (2013.01); *F16L 39/00* (2013.01); *F01N 13/004* (2013.01); *F01N 13/10* (2013.01); *F01N 13/141* (2013.01); *F01N 13/1827* (2013.01); *F16L 21/05* (2013.01)

(58) Field of Classification Search
USPC ........ 60/321; 285/123.15, 123.16, 41, 95, 96, 285/106
See application file for complete search history.

(56) References Cited

U.S. PATENT DOCUMENTS 4,549,753 A * 10/1985 Nuytten .......................... 285/95
5,011,194 A *  4/1991 Nitta .............................. 285/41
5,265,652 A * 11/1993 Brunella ................... 285/123.15

FOREIGN PATENT DOCUMENTS

JP    2003-074351 A    3/2003
JP    2010-248909 A    11/2010

* cited by examiner

*Primary Examiner* — Aaron Dunwoody
(74) *Attorney, Agent, or Firm* — Keating & Bennett, LLP (57) ABSTRACT

An exhaust pipe connecting structure includes a first exhaust pipe, a second exhaust pipe, a seal member, and a gasket. The second exhaust pipe is a separate part from the first exhaust pipe. The second exhaust pipe is connected to the first exhaust pipe and defines an exhaust passage together with the first exhaust pipe. The seal member is located between the first exhaust pipe and the second exhaust pipe in a connecting portion where the first exhaust pipe and the second exhaust pipe connect. The gasket is arranged between the seal member and the exhaust passage in the connecting portion where the first exhaust pipe and the second exhaust pipe connect together. The gasket has a heat resistant property.

13 Claims, 11 Drawing Sheets

EXHAUST PIPE CONNECTING STRUCTURE

BACKGROUND OF THE INVENTION

1. Field of the Invention

The present invention relates to a connecting structure for an exhaust pipe.

2. Description of the Related Art

An exhaust passage for guiding exhaust gas from an engine sometimes includes a plurality of separate exhaust pipes connected together. In the case of an outboard motor, for example, restrictions on the shape and layout of an exhaust pipe are severe because space is limited inside a housing enclosing the engine. Consequently, it is difficult to make the exhaust pipe have a linear shape and the shape is often complex. In such a case, since it is difficult to form the exhaust pipe as a one-piece integral unit, an exhaust passage is made by connecting a plurality of exhaust pipes together. When a plurality of exhaust pipes are connected together in this way, O-rings and other seal members must be provided at the connecting portions of the exhaust pipes as is demonstrated in, for example, Japanese Laid-open Patent Application No. 2010-248909.

However, the seal members are generally made of a resin material. Consequently, the seal members are susceptible to damage caused by heat from exhaust gas. Therefore, it is necessary to provide a structure to protect the seal members from the heat of the exhaust gas. In Japanese Laid-open Patent Application No. 2003-74351, for example, a seal member is arranged between a first exhaust passage and a second exhaust passage and a structure is disclosed in which an external wall of the first exhaust passage and an internal surface of the second exhaust passage are in close contact with each other.

However, with the structure disclosed in Japanese Laid-open Patent Application No. 2003-74351, a gap develops between the first exhaust passage and the second exhaust passage due to a difference in amounts of thermal expansion undergone by the first exhaust passage and the second exhaust passage. When such a gap occurs between the first exhaust passage and the second exhaust passage, exhaust gas enters through the gap and the seal member is exposed to the exhaust gas. As a result, the seal member is damaged by heat of the exhaust gas. Thus, with the structure disclosed in Japanese Laid-open Patent Application No. 2003-74351, it is difficult to prevent the seal member from being exposed to exhaust gas.

SUMMARY OF THE INVENTION

Preferred embodiments of the present invention provide an exhaust pipe connecting structure that prevents a seal member from being damaged by heat of exhaust gas.

An exhaust pipe connecting structure according to a preferred embodiment of the present invention includes a first exhaust pipe, a second exhaust pipe, a seal member, and a gasket. The second exhaust pipe is a separate part from the first exhaust pipe. The second exhaust pipe is connected to the first exhaust pipe and defines an exhaust passage together with the first exhaust pipe. The seal member is arranged between the first exhaust pipe and the second exhaust pipe in a connecting portion where the first exhaust pipe and the second exhaust pipe connect together. The gasket is arranged between the seal member and the exhaust passage in the connecting portion where the first exhaust pipe and the second exhaust pipe connect together. The gasket has a heat resistant property.

In an exhaust pipe connecting structure according to a preferred embodiment of the present invention, a heat resistant gasket is arranged between the seal member and the exhaust passage in a connecting portion where the first exhaust pipe and the second exhaust pipe connect together. As a result, even if a gap opens between the first exhaust pipe and the second exhaust pipe due to a difference of thermal expansion amounts, the gasket prevents exhaust gas from reaching the seal member. Thus, the seal member can be prevented from being damaged by exhaust gas heat.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
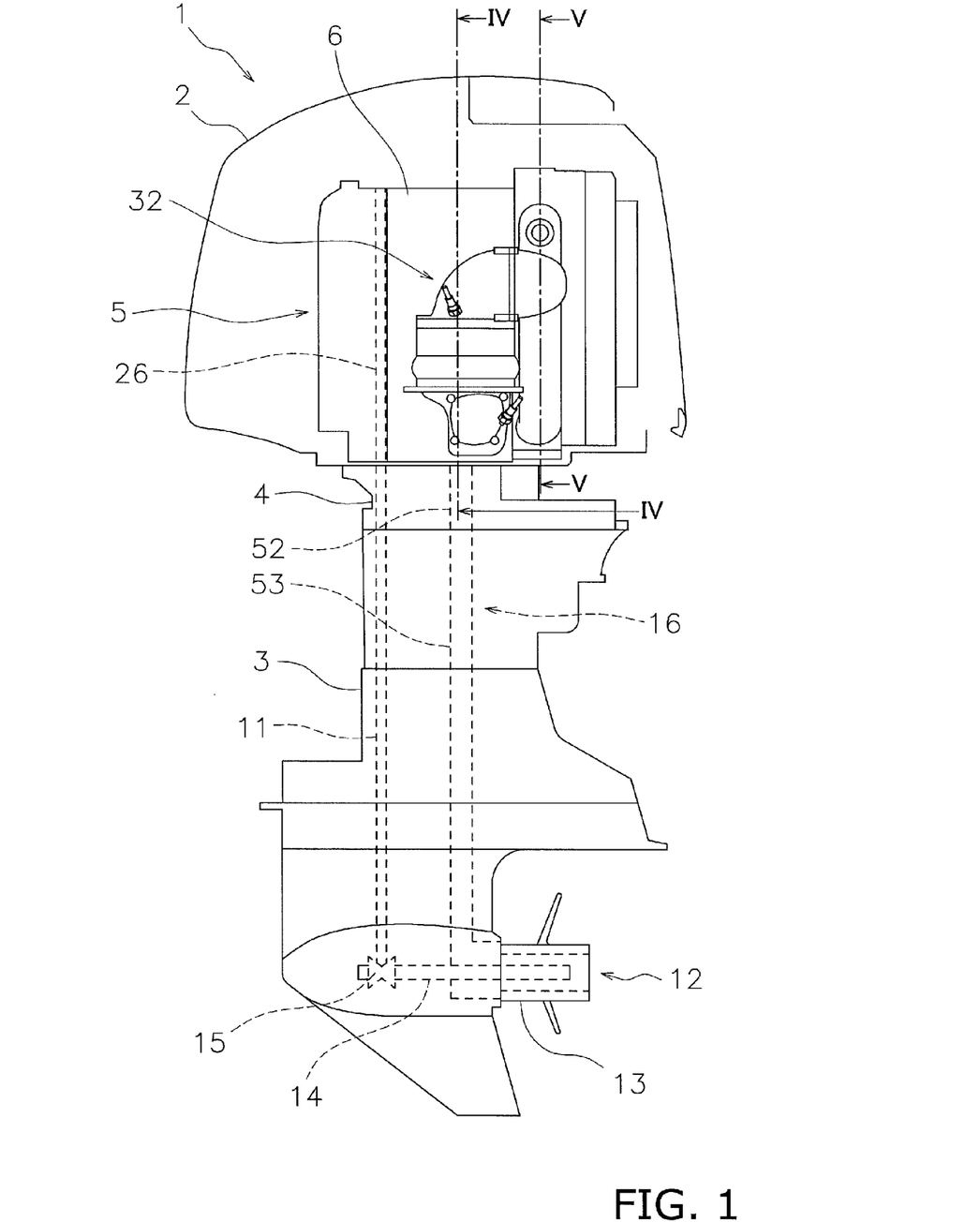
FIG. 1 is a side view of an outboard motor equipped with an exhaust pipe connecting structure according to a preferred embodiment of the present invention.
Figure 2:
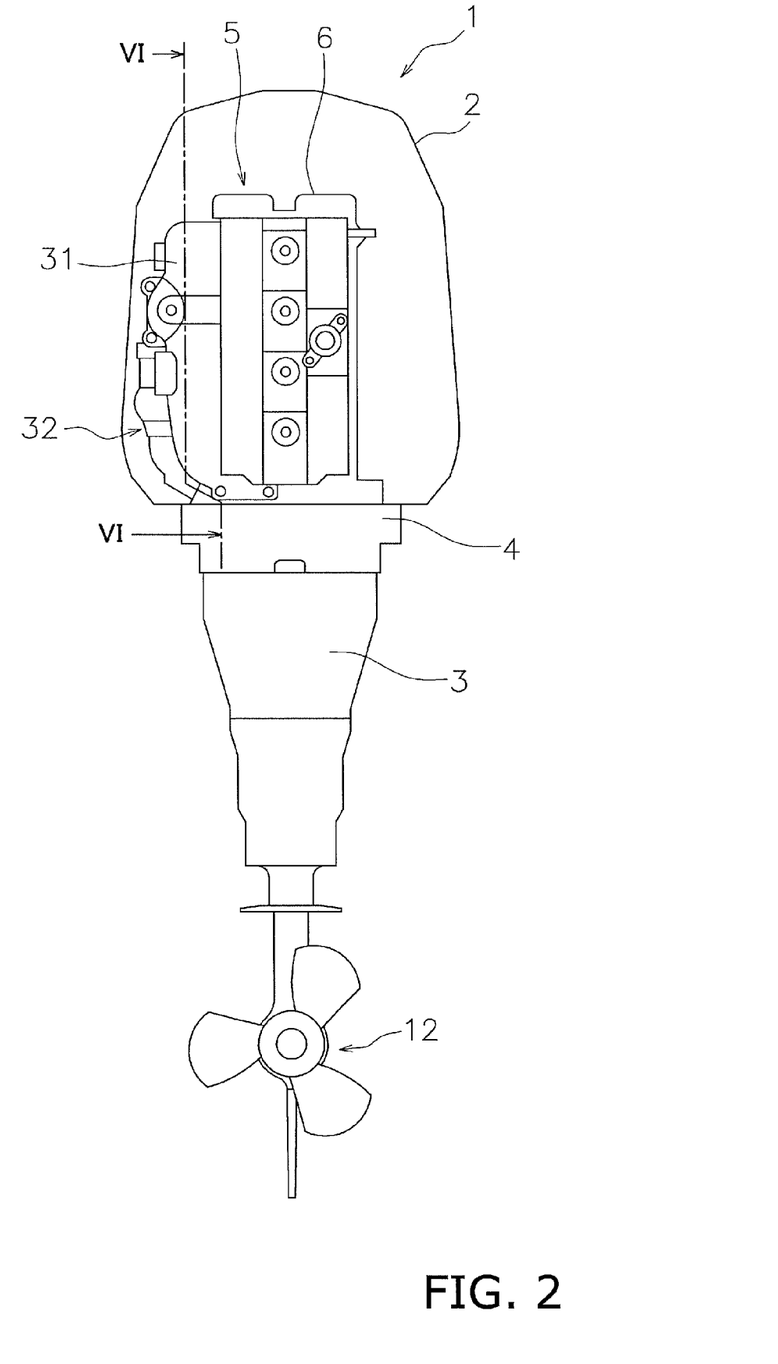
FIG. 2 is a rear view of the outboard motor.

FIG. 1 is a side view of an outboard motor 1 equipped with an exhaust pipe connecting structure according to a preferred embodiment of the present invention. FIG. 2 is a rear view of the outboard motor 1 according to the preferred embodiment of the present invention. As shown in FIG. 1 and FIG. 2, the outboard motor 1 according to this preferred embodiment includes an upper casing 2, a lower casing 3, an exhaust guide section 4, an engine unit 5, and a catalytic converter unit 32. In FIG. 1 and FIG. 2, the upper casing 2 is depicted in a cross sectional view in order to facilitate understanding. The upper casing 2, the lower casing 3, and the engine unit 5 are fixed to the exhaust guide section 4.

The engine unit 5 is arranged inside the upper casing 2. The engine unit 5 includes an engine 6. As shown in FIG. 1, a drive shaft 11 is arranged inside the lower casing 3. The drive shaft 11 is arranged along a vertical direction inside the lower casing 3. The drive shaft 11 is fixed to a crankshaft 26 of the engine 6. A propeller 12 is arranged on a lower portion of the lower casing 3. The propeller 12 is arranged below the engine 6. The propeller 12 includes a propeller boss 13. A propeller shaft 14 is arranged inside the propeller boss 13. The propeller shaft 14 is arranged to extend along a longitudinal direction (front-back direction). The propeller shaft 14 is coupled to a lower portion of the drive shaft 11 through a bevel gear 15.

In the outboard motor 1, a drive force generated by the engine 1 is transmitted to the propeller 12 through the drive shaft 11 and the propeller shaft 14. As a result, the propeller 12 is rotated in a forward direction or a reverse direction. In this way, a propulsion force is generated which propels a watercraft hull to which the outboard motor 1 is attached forward or backward.

The outboard motor 1 includes an exhaust passage 16. The exhaust passage 16 extends from the engine 6 to the propeller boss 13 of the propeller 12 through the insides of the exhaust guide section 4 and the lower casing 3. Exhaust gas discharged from the engine 6 passes from the exhaust passage 16 to the water through an inside of the propeller boss 13.

Figure 3:
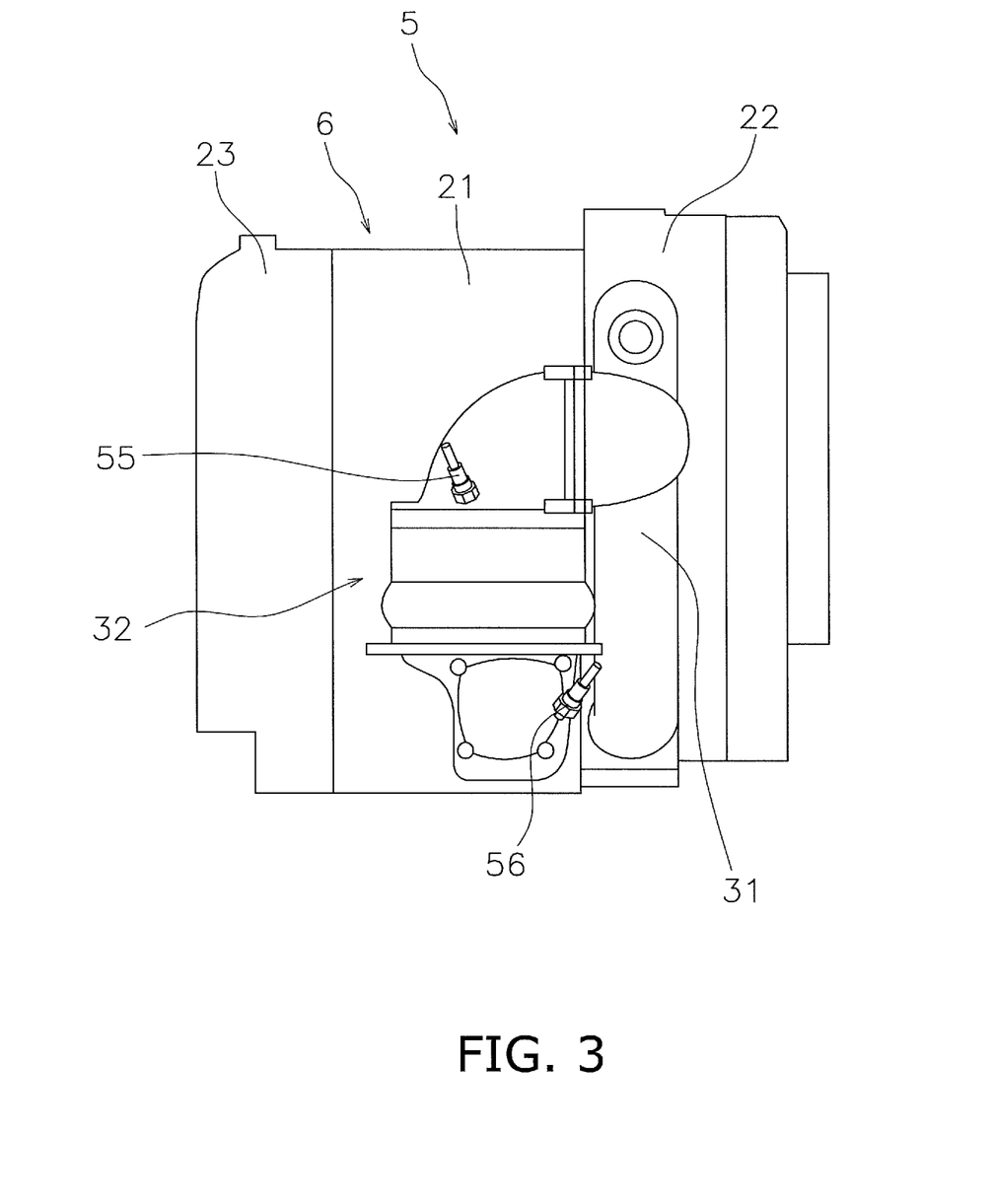
FIG. 3 is a side view of an engine unit.
Figure 4:
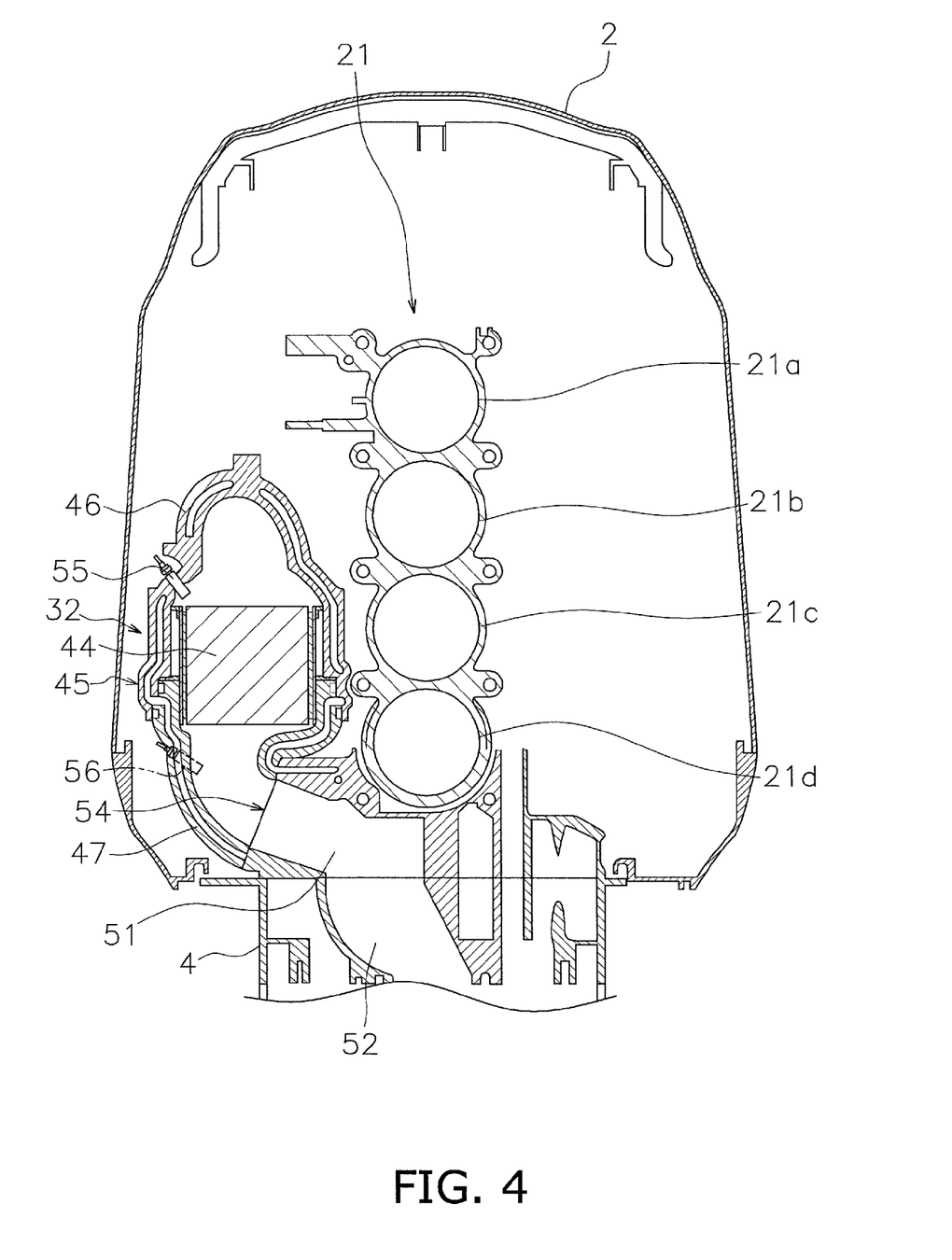
FIG. 4 is a sectional view taken along a section line IV-IV of FIG. 1.

FIG. 3 is a side view of the engine unit 5. As shown in FIG. 3, the engine 6 includes a cylinder block 21, a cylinder head 22, and a crankcase 23. The cylinder block 21 is arranged on the exhaust guide section 4 and is fixed to the exhaust guide section 4. FIG. 4 is a sectional view of the outboard motor 1 taken along a section line IV-IV of FIG. 1. As shown in FIG. 4, the cylinder block 21 preferably includes four cylinders 21a to 21d, for example. The four cylinders 21a to 21d are arranged side-by-side above and below one another, for example.

Figure 5:
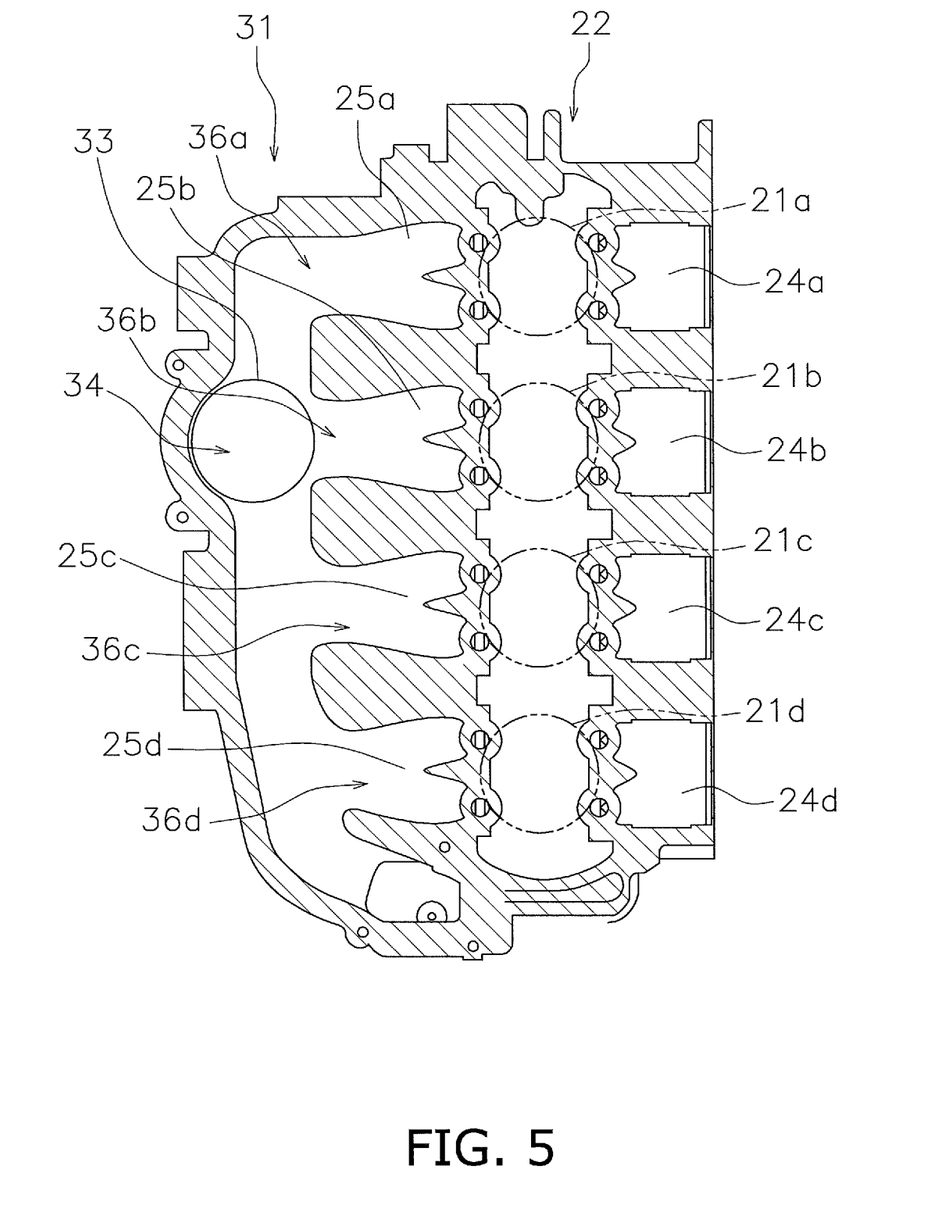
FIG. 5 is a sectional view taken along a section line V-V of FIG. 1.

As shown in FIG. 3, the cylinder head 22 is arranged rearward of the cylinder block 21. FIG. 5 is a sectional view of the outboard motor 1 taken along a section line V-V of FIG. 1. As shown in FIG. 5, intake ports 24a to 24d and exhaust ports 25a to 25d are located inside the cylinder head 22. Each of the intake ports 24a to 24d and each of the exhaust ports 25a to 25d are connected to one of the cylinders 21a to 21d, respectively. The intake ports 24a to 24d are arranged vertically above and below one another. The intake ports 24a to 24d are connected to a fuel supplying device not shown in the drawings. The exhaust ports 25a to 25d are arranged vertically above and below one another. The exhaust ports 25a to 25d extend in a lateral direction and connected to an exhaust manifold 31 explained later.

As shown in FIG. 3, a crankcase 23 is arranged frontward of the cylinder block 21. The crankshaft 26 (see FIG. 1) is arranged inside the crankcase 23. The crankshaft 26 extends along a vertical direction. An upper end portion of the drive shaft 11 described above is connected to a lower end portion of the crankshaft 26. Movement of pistons (not shown) arranged inside the cylinders 21a to 21d is transmitted to the drive shaft 11 through the crankshaft 26.

As shown in FIG. 3, the engine unit 5 includes the exhaust manifold 31. The exhaust manifold 31 is arranged laterally of the cylinder head 22. The exhaust manifold 31 preferably is formed as an integral portion of the cylinder head 22. The exhaust manifold 31 is arranged to extend along a vertical direction. As shown in FIG. 5, a plurality of openings 36a to 36d are located in the exhaust manifold 31 and the exhaust manifold 31 connects to the exhaust ports 25a to 25d through the openings 36a to 36d, respectively. Exhaust gas discharged from the exhaust ports 25a to 25d collects in the exhaust manifold 31. The exhaust manifold 31 includes a first opening 33. The first opening 33 is positioned between the cylinder 21a positioned highest and the cylinder 21d positioned lowest among the plurality of cylinders 21a to 21d.

Figure 6:
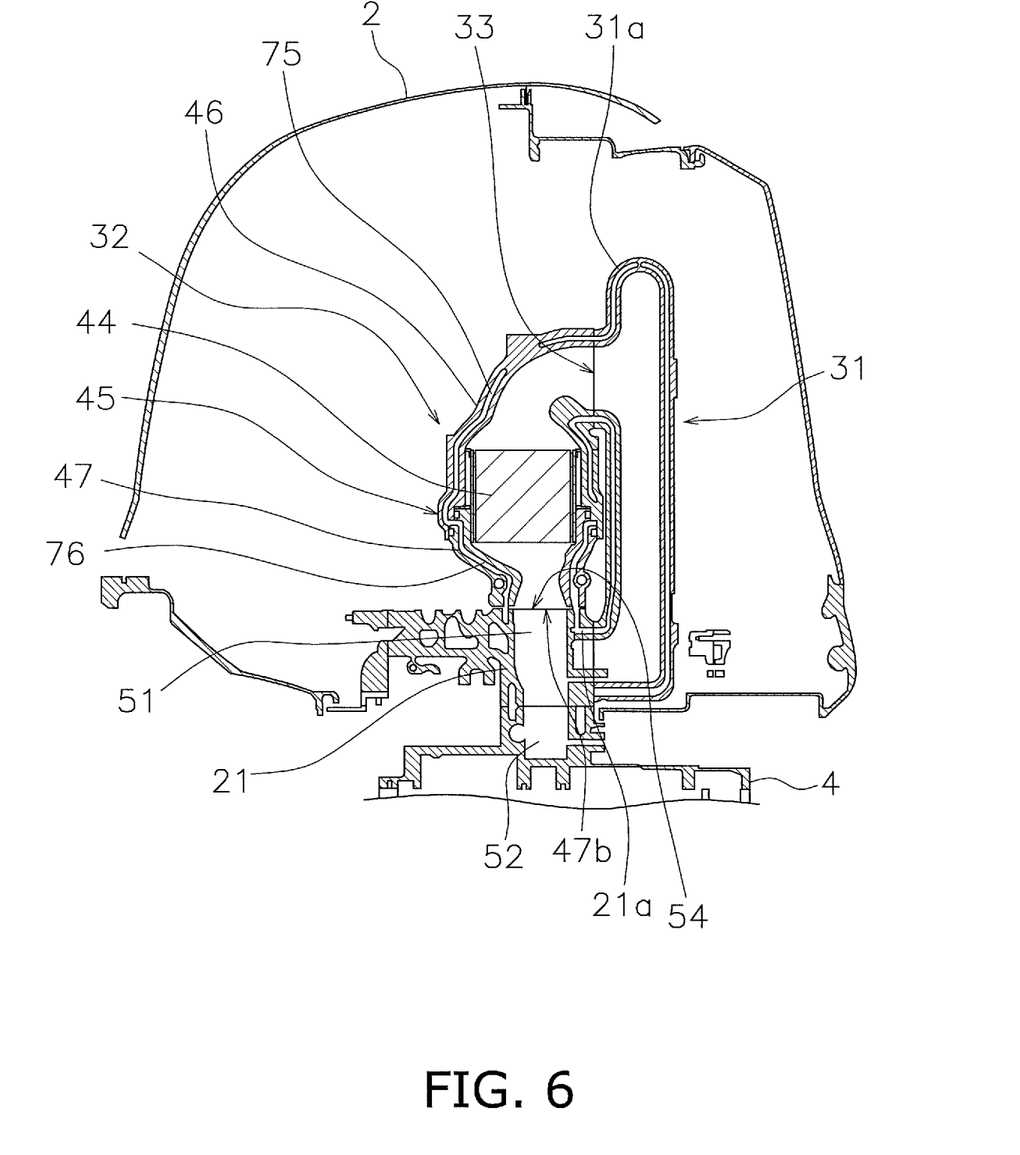
FIG. 6 is a sectional view taken along a section line VI-VI of FIG. 2.

As shown in FIG. 4 and FIG. 6, the catalytic converter unit 32 includes a catalyst member 44 and a catalyst housing pipe 45. The catalyst member 44 is arranged inside the catalyst housing pipe 45. The catalyst member 44 is positioned higher than a lower edge portion of the cylinder 21d, which is positioned lowest among the four cylinders 21a to 21d. The catalyst housing pipe 45 is arranged horizontally side-by-side with respect to the exhaust manifold 31. The catalyst housing pipe 45 is arranged to extend along a vertical direction. The catalyst housing pipe 45 houses the catalyst member 44. The catalyst member 44 supports a catalyst serving to clean exhaust gas. The catalyst used preferably is, for example, a three-way catalyst. The catalyst member 44 preferably is a cylindrically shaped member having a honeycomb structure. Exhaust gas flows from above to below through the catalyst member 44. The exhaust gas passing through the exhaust passage 16 is cleaned as it passes through the catalyst member 44 inside the catalyst housing pipe 45. The catalyst housing pipe 45 includes a first exhaust pipe 46 and a second exhaust pipe 47. The first exhaust pipe 46 and the second exhaust pipe 47 are separate members. The first exhaust pipe 46 and the second exhaust pipe 47 preferably are both made of aluminum, for example. The second exhaust pipe 47 is arranged below the first exhaust pipe 46. The second exhaust pipe 47 defines a portion of the exhaust passage 16 together with the first exhaust pipe 46. A connecting structure by which the first exhaust pipe 46 and the second exhaust pipe 47 are connected together will be explained in detail later.

The exhaust manifold 31 and the catalytic converter unit 32 define a portion of the exhaust passage 16. The exhaust passage 16 also includes a first lower passage 51, a second lower passage 52, and a third lower passage 53. The first lower passage 51 is located inside the cylinder block 21. The first lower passage 51 includes a second opening 54. The second opening 54 is located in a lower portion of a side surface of the cylinder block 21. The first lower passage 51 is connected to the catalytic converter unit 32 through the second opening 54. The second lower passage 52 is located inside the exhaust guide section 4. As shown in FIG. 4 and FIG. 6, the second lower passage 52 is connected to the first lower passage 51. As shown in FIG. 1, the third lower passage 53 is located inside the lower casing 3. The third lower passage 53 is connected to the second lower passage 52. The third lower passage 53 is also connected to the propeller boss 13.

In the outboard motor 11 according to this preferred embodiment, exhaust gas from the exhaust ports 25a to 25d of the engine 6 collects in the exhaust manifold 31. The exhaust gas flows from the exhaust manifold 31 to the catalytic converter unit 32. The exhaust gas is cleaned as it passes through the catalyst member 44 in the catalytic converter unit 32. The exhaust gas then passes through the first lower passage 51, the second lower passage 52, the third lower passage 53, and the inside of the propeller boss 13 and is discharged to the outside.

As shown in FIG. 3 and FIG. 4, the catalytic converter unit 32 is equipped with a first oxygen sensor 55 and a second oxygen sensor 56 to detect an oxygen concentration of the exhaust gas. The first oxygen sensor 55 is arranged upstream of the catalyst member 44 inside the exhaust passage 16. More specifically, the first oxygen sensor 55 is arranged above the catalyst member 44 inside the catalyst housing pipe 45. The second oxygen sensor 56 is arranged below the catalyst member 44 inside the catalyst housing pipe 45. The second oxygen sensor 56 is arranged downstream of the catalyst member 44 inside the exhaust passage 16. Detection signals from the first oxygen sensor 55 and the second oxygen sensor 56 are fed to an ECU not shown in the drawings. The ECU controls the engine 6 based on detection values from the first oxygen sensor 55 and the second oxygen sensor 56.

Figure 7:
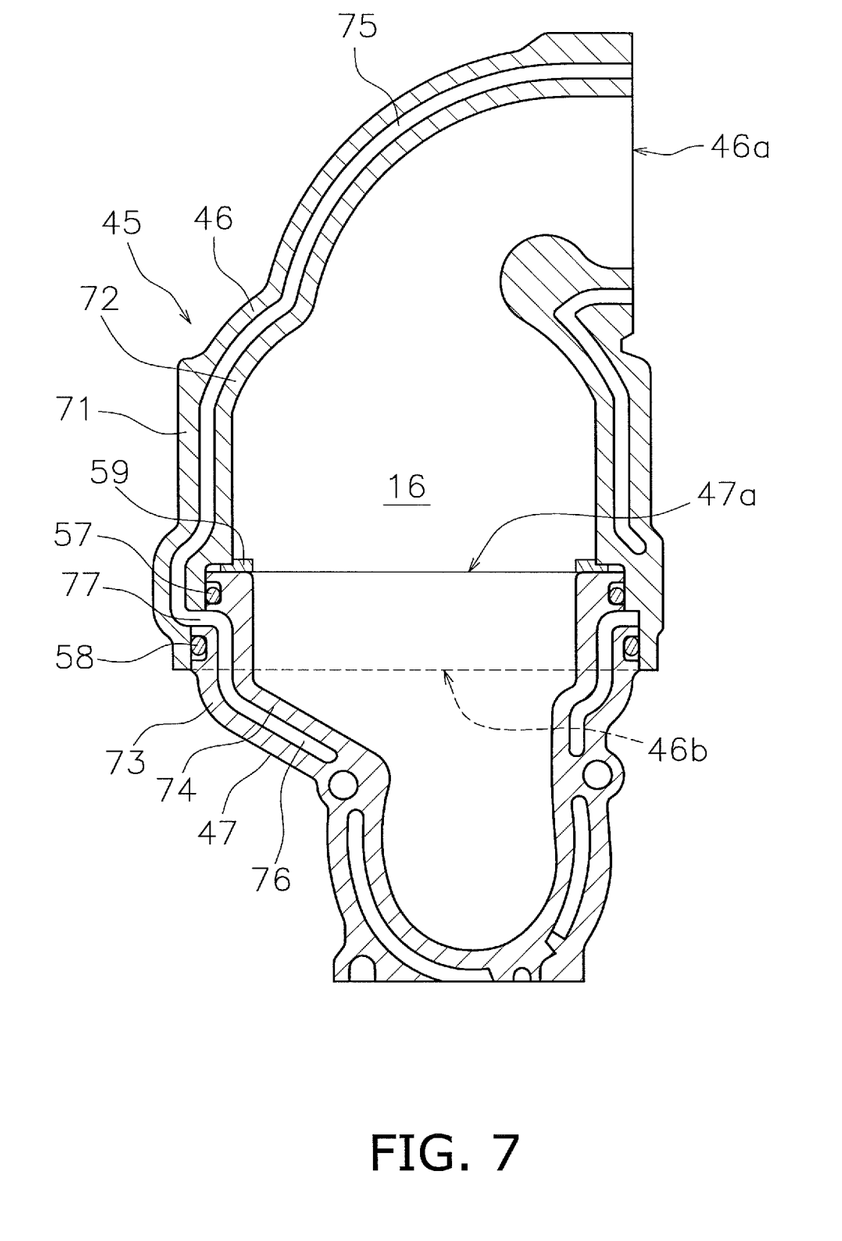
FIG. 7 is a sectional view of a catalytic converter unit.

A connecting structure by which the first exhaust pipe 46 and the second exhaust pipe 47 are connected together will now be explained in detail. FIG. 7 is a cross sectional view taken along an axial direction of the catalyst housing pipe 45. The first exhaust pipe 46 includes a first end section 46a and a second end section 46b. The first end section 46a of the first exhaust pipe 46 is connected to the engine unit 5. More specifically, the first end section 46a of the first exhaust pipe 46 is connected to the first opening 33 of the exhaust manifold 31. The second exhaust pipe 47 includes a first end section 47a and a second end section 47b (see FIG. 6). The second end section 46b of the first exhaust pipe 46 is connected to the first end section 47a of the second exhaust pipe 47. The second end section 47b of the second exhaust pipe 47 is connected to the engine unit 5. More specifically, as shown in FIG. 6, the second end section 47b of the second exhaust pipe 47 is connected to the second opening 54 of the cylinder block 21.

Figure 8:
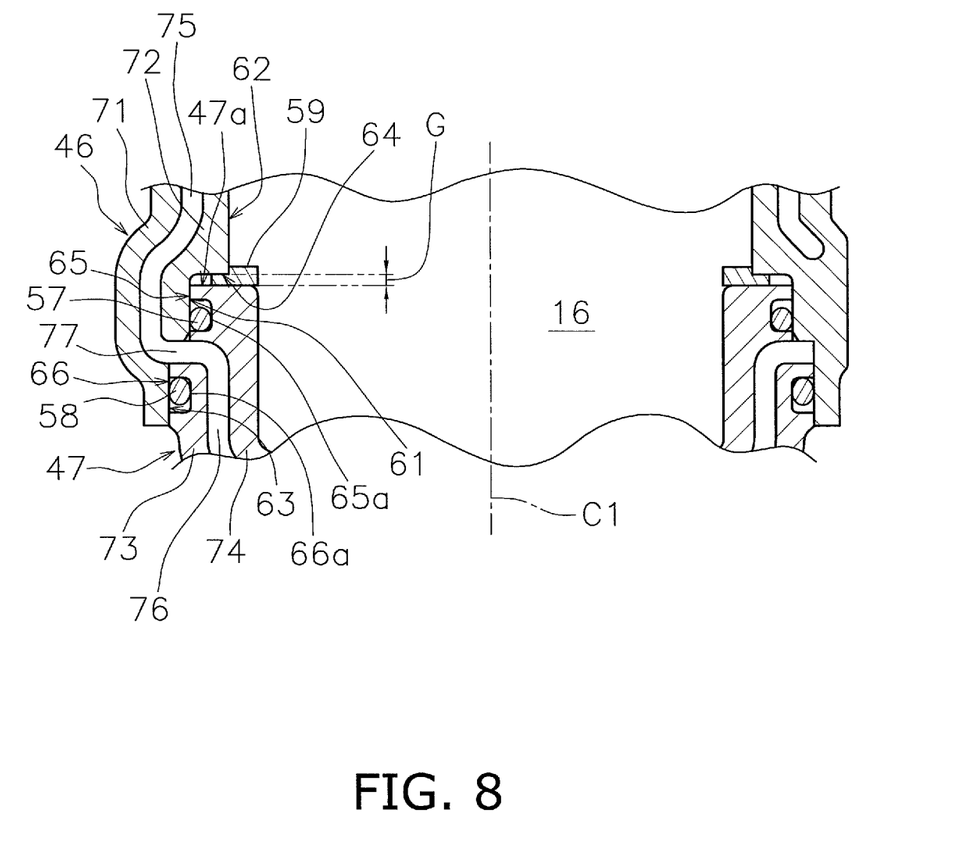
FIG. 8 is an enlarged view of a connecting portion where a first exhaust pipe and a second exhaust pipe of the catalytic converter connect together.

FIG. 8 is an enlarged view of a connecting portion where the first exhaust pipe 46 and the second exhaust pipe 47 connect together. The first exhaust pipe 46 includes a first internal surface section 61, a second internal surface section 62, a third internal surface section 63, and a step-shaped section 64. The first end section 47a of the second exhaust pipe 47 is inserted into the first internal surface section 61. The second internal surface section 62 has an internal diameter smaller than an internal diameter of the first internal surface section 61. The second internal surface section 62 is positioned higher than the first internal surface section 61. The step-shaped section 64 is arranged between the first internal surface section 61 and the second internal surface section 62. The third internal surface section 63 is positioned lower than the first internal surface section 61. The third internal surface section 63 has an internal diameter larger than an internal diameter of the first internal surface section 61. The second exhaust pipe 47 includes a first external surface section 65 and a second external surface section 66. The first external surface section 65 contacts the first internal surface section 61 of the first exhaust pipe 46. A first recessed section 65a is arranged along a circumferential direction of the first external surface section 65. The second external surface section 66 contacts the third internal surface section 63 of the first exhaust pipe 46. The second external surface section 66 has an external diameter larger than an external diameter of the first external surface section 65. The second external surface section 66 is positioned lower than the first external surface section 65. A second recessed section 66a is arranged along a circumferential direction of the second external surface section 66. The first exhaust pipe 46 and the second exhaust pipe 47 are arranged such that they are separated by a gap G in an axial direction. Thus, the step-shaped section 64 of the first exhaust pipe 46 and the first end section 47a of the second exhaust pipe 47 are arranged such that they are separated by a gap G in an axial direction.

The first exhaust pipe 46 includes a first external pipe 71 and a first internal pipe 72. The first internal pipe 72 is arranged inward of the first external pipe 71. A lower end of the first external pipe 71 is positioned lower than a lower end of the first internal pipe 72. The first internal surface section 61, the second internal surface section 62, and the step-shaped section 64 are included in an internal surface of the first internal pipe 72. The third internal surface section 63 is included in an internal surface of the first external pipe 71. The third internal surface section 63 is positioned lower than a lower end of the first internal pipe 72. The second exhaust pipe 47 includes a second external pipe 73 and a second internal pipe 74. The second internal pipe 74 is arranged inward of the second external pipe 73. An upper end of the second internal pipe 74 is positioned higher than an upper end of the second external pipe 73. The first external surface section 65 is included in an external surface of the second internal pipe 74. The second external surface section 66 is included in an external surface of the second external pipe 73. The first external surface section 65 is positioned higher than an upper end of the second external pipe 73.

The first exhaust pipe 46 includes a first coolant passage 75. The first coolant passage 75 is arranged between an external surface and an internal surface of the first exhaust pipe 46. More specifically, the first coolant passage 75 is arranged between the first external pipe 71 and the first internal pipe 72. The second exhaust pipe 47 includes a second coolant passage 76. The second coolant passage 76 is arranged between an external surface and an internal surface of the second exhaust pipe 47. More specifically, the second coolant passage 76 is arranged between the second external pipe 73 and the second internal pipe 74. As shown in FIG. 6, the first coolant passage 75 communicates with a coolant passage 31a of the exhaust manifold 31. The second coolant passage 76 communicates with a coolant passage 21a of the cylinder block 21. As shown in FIG. 8, the first coolant passage 75 and the second coolant passage 76 communicate with each other at a communication section 77. The communication section 77 is arranged at a connecting portion where the first exhaust pipe 46 and the second exhaust pipe 47 connect. More specifically, the communication section 77 passes between the first internal surface section 61 and the third internal surface section 63 of the first exhaust pipe 46. The communication section 77 also passes between the first external surface section 65 and the second external surface section 66 of the second exhaust pipe 47. The communication section 77 extends along a radial direction of the first exhaust pipe 46 and the second exhaust pipe 47. Consequently, the first coolant passage 75 and the second coolant passage 76 are configured such that, at the communication section 77, the coolant flows in a direction intersecting an axial direction of the first exhaust pipe 46 and the second exhaust pipe 47.

A first seal member 57 and a second seal member 58 are arranged in a connecting portion where the first exhaust pipe 46 and the second exhaust pipe 47 connect. The first seal member 57 and the second seal member 58 are arranged between the first exhaust pipe 46 and the second exhaust pipe 47. The first seal member 57 and the second seal member 58 are made of resin. The first seal member 57 and the second seal member 58 both preferably have a ring-shaped configuration. Each of the first seal member 57 and the second seal member 58 is, for example, an O-ring made of resin. The first seal member 57 is arranged between the first internal pipe 72 and the second internal pipe 74. More specifically, the first seal member 57 is arranged in the first recessed section 65a of the first external surface section 65. The first seal member 57 is arranged between the communication section 77 and the exhaust passage 16. The first seal member 57 is also arranged in a position closer to a center (see centerline C1 in FIG. 8) of the exhaust passage 16 than the second seal member 58. The second seal member 58 is arranged between the first external pipe 71 and the second external pipe 73. More specifically, the second seal member 58 is arranged in the second recessed section 66a of the second external surface section 66. Thus, the second seal member 58 is arranged between the communication section 77 and an external space outside the first exhaust pipe 46 and the second exhaust pipe 47. Also, the communication section 77 is arranged between the first seal member 57 and the second seal member 58 along the axial direction.

A heat resistant gasket 59 is arranged in the connecting portion where the first exhaust pipe 46 and the second exhaust pipe 47 connect. The gasket 59 is made of, for example, alumina or another ceramic fiber. The gasket 59 preferably has a ring-shaped configuration. As explained previously, the gasket 59 is arranged in a gap G between the step-shaped section 64 of the first exhaust pipe 46 and the first end section 47a of the second exhaust pipe 47. More specifically, the gasket 59 is arranged in a gap G between the step-shaped section 64 of the first internal pipe 72 and the first end section 47a of the second internal pipe 74. The gasket 59 is pinched between the first exhaust pipe 46 and the second exhaust pipe 47. The gasket 59 is arranged between the first seal member 57 and the exhaust passage 16.

In the exhaust pipe connecting structure according to this preferred embodiment, the heat resistant gasket 59 is preferably arranged in the connecting portion where the first exhaust pipe 46 and the second exhaust pipe 47 connect together. The gasket 59 is positioned between the first seal member 57 and the exhaust passage 16. As a result, even if a gap opens between the first exhaust pipe 46 and the second exhaust pipe 47 due to a difference of thermal expansion amounts, the gasket 59 prevents exhaust gas from reaching the first seal member 57. Thus, the first seal member 57 can be prevented from being damaged by exhaust gas heat.

In particular, in the exhaust pipe connecting structure according to this preferred embodiment, both the first exhaust pipe 46 and the second exhaust pipe 47 are fixed to the engine unit 5. Consequently, it is difficult to precisely set a position of the connecting portion where the first exhaust pipe 46 and the second exhaust pipe 47 connect together due to such factors as error of a position where the first exhaust pipe 46 and the exhaust manifold 31 are connected together, error of a position where the second exhaust pipe 47 and the cylinder block 21 are connected together, dimensional error of the first exhaust pipe 46, and dimensional error of the second exhaust pipe 47. With the exhaust pipe connecting structure according to this preferred embodiment, even if an error exists in the position of the connecting portion where the first exhaust pipe 46 and the second exhaust pipe 47 connect, the error can be absorbed by the first seal member 57 and the second seal member 58. Also, even if an error exists in the position of the connecting portion where the first exhaust pipe 46 and the second exhaust pipe 47 connect, the gasket 59 arranged in the gap G between the first exhaust pipe 46 and the second exhaust pipe 47 can prevent exhaust gas from reaching the first seal member 57.

The gasket 59 is pinched in a gap G between the step-shaped section 64 of the first exhaust pipe 46 and the first end section 47a of the second exhaust pipe 47. Consequently, the gasket 59 is held securely. Thus, the position of the gasket 59 can be prevented from shifting. Also, the gasket 59 can be installed easily when the first exhaust pipe 46 and the second exhaust pipe 47 are assembled.

The first seal member 57 and the second seal member 58 are arranged along a direction in which the exhaust gas flows. Additionally, the communication section 77 between the first coolant passage 75 and the second coolant passage 76 passes between the first seal member 57 and the second seal member 58. Consequently, the sealing action of the first seal member 57 and the second seal member 58 can be maintained even if the first exhaust pipe 46 and the second exhaust pipe 47 expand in a direction in which exhaust gas flows.

The first seal member 57 is located at a position closer to a center of the exhaust passage 16 than the second seal member 58. If the first seal member 57 and the second seal member 58 were arranged in a straight line along an axial direction of the first exhaust pipe 46 and the second exhaust pipe 47 (see FIG. 9), then it would be necessary to make the external diameters of the first external surface section 65 and the second external surface section 66 the same. It would also be necessary to make the internal diameters of the first internal surface section 61 and the third internal surface section 63 the same. In such a case, when the first exhaust pipe 46 and the second exhaust pipe 47 are assembled together, the third internal surface section 63 would contact the first seal member 57 as it moves and, afterwards, the first internal surface section 61 would contact the first seal member 57 as it moves. Consequently, there is a possibility that the seal member 57 would undergo a large deformation when the first exhaust pipe 46 and the second exhaust pipe 47 are assembled. In such a case, there is a possibility that the first seal member 57 would become jammed between the first exhaust pipe 46 and the second exhaust pipe 47.

Conversely, in the exhaust pipe connecting structure according to this preferred embodiment, the first seal member 57 is preferably located closer to a center of the exhaust passage 16 than the second seal member 58 is. Thus, the first exhaust pipe 46 and the second exhaust pipe 47 can be assembled without the first seal member 57 contacting the third internal surface section 63 of the first exhaust pipe 46. Consequently, deformation of the seal member 57 can be held to a small amount when the first exhaust pipe 46 and the second exhaust pipe 47 are assembled. As a result, the first seal member 57 can be prevented from becoming jammed between the first exhaust pipe 46 and the second exhaust pipe 47 when the first exhaust pipe 46 and the second exhaust pipe 47 are assembled.

Although a preferred embodiment of the present invention has been described above, the present invention is not limited to the preferred embodiment described above. Various changes can be made without departing from the scope of the present invention.

Although in the previously explained preferred embodiment the exhaust pipe connecting structure is exemplified as preferably being used in an outboard motor, an exhaust pipe connecting structure according to the present invention is not limited to an outboard motor and can be applied to other devices.

The number of cylinders is not limited to four. Having three or fewer cylinders is also acceptable. It is also acceptable to have five or more cylinders. It is acceptable for the first seal member 57 and the second seal member 58 to be made of rubber or another elastic material. Although it is preferable to make the first exhaust pipe 46 and the second exhaust pipe 47 out of aluminum from the standpoint of reducing weight, it is acceptable to make them out of another material.

The gasket 59 is not limited to a ceramic and it is acceptable to make the gasket 59 of another heat resistant material. For example, the gasket 59 may preferably be made of a material that is heat resistant against temperatures equal to or above 500° C. It is also preferable for the gasket 59 to be made of a material that can accommodate the dimensional errors of the first exhaust pipe 46 and the second exhaust pipe 47. For example, the gasket 59 is not limited to a member made of fibers and it is acceptable for the gasket 59 to be a spiral wound gasket or other member having an elastic property.

Figure 9:
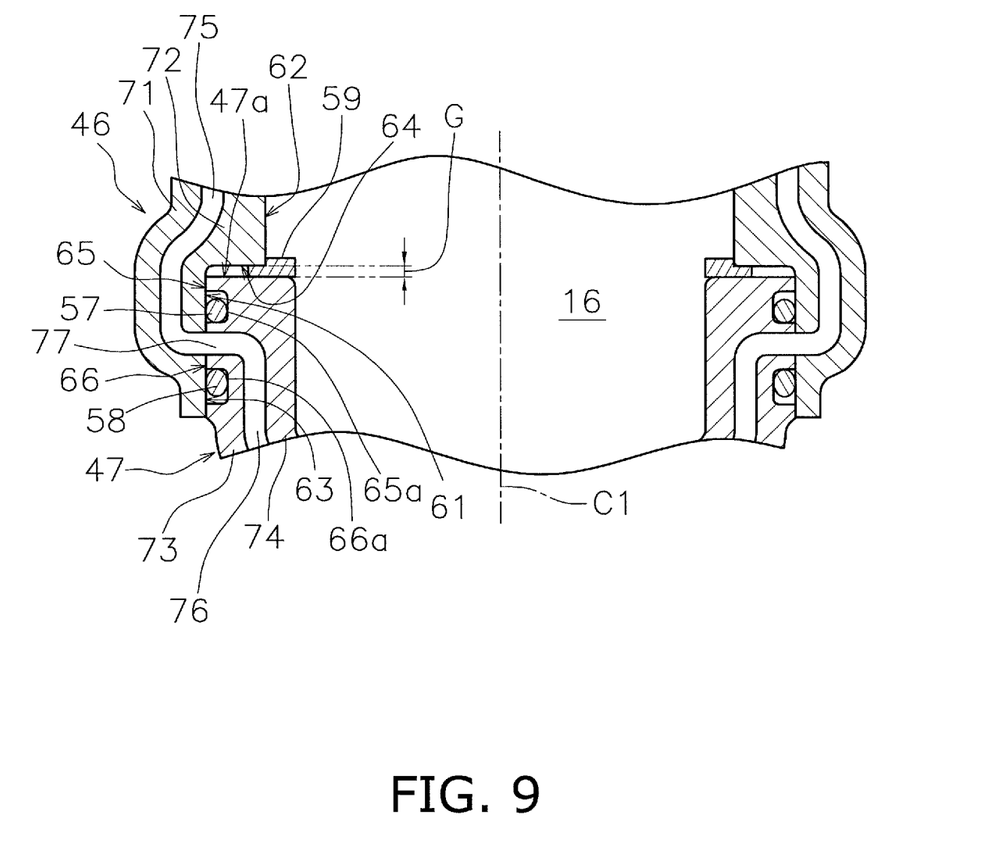
FIG. 9 is an enlarged view of a connecting portion where a first exhaust pipe and a second exhaust pipe of the catalytic converter according to another preferred embodiment of the present invention connect together.

It is also acceptable for the first seal member 57 and the second seal member 58 to be arranged along a straight line in an axial direction of the first exhaust pipe 46 and the second exhaust pipe 47 as shown in FIG. 9. However, from the standpoint of preventing the first seal member 57 from getting jammed as explained above, it is preferable for the first seal member 57 to be located at a position closer to a center of the exhaust passage 16 than the second seal member 58.

Although in the previously explained preferred embodiment the gasket 59 is arranged near a coolant passage, it is acceptable to arrange the gasket at a position where a coolant passage does not exist. For example, when a seal member is provided to absorb dimensional error in a connecting portion where a first exhaust pipe 46 and a second exhaust pipe 47 not provided with a coolant passage connect to each other, a gasket 59 can protect the seal member from exhaust gas.

Figure 10:
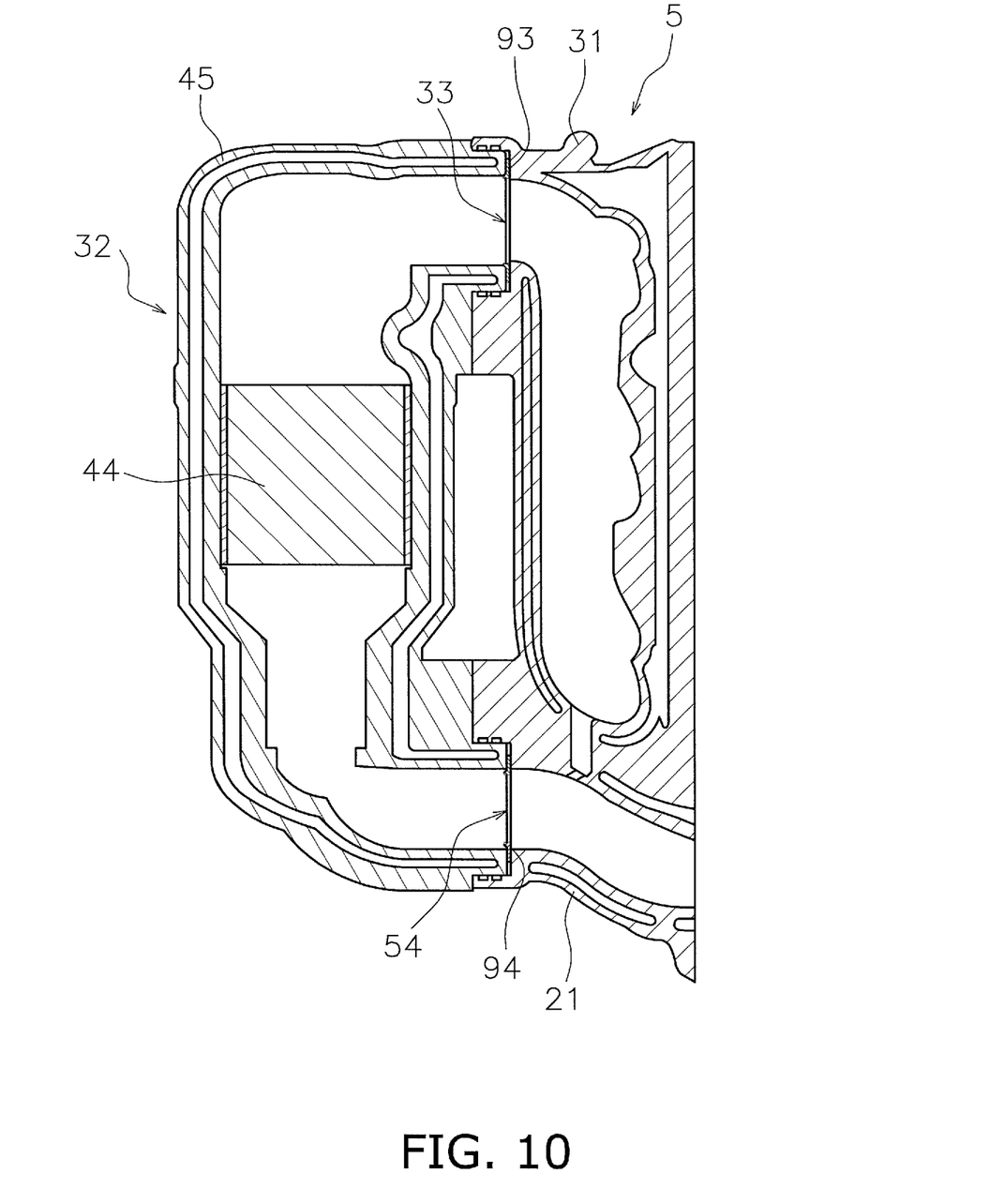
FIG. 10 is a sectional view showing an exhaust pipe connecting structure according to another preferred embodiment of the present invention.
Figure 11:
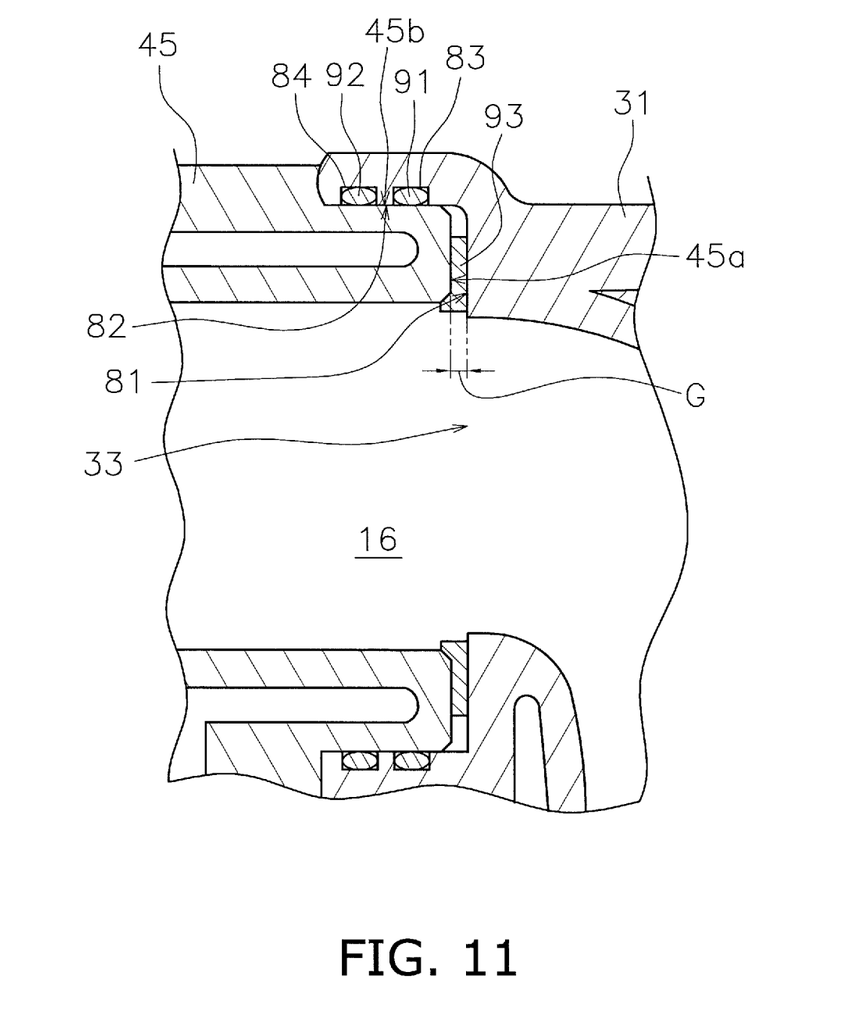
FIG. 11 is an enlarged view of a connecting portion where the catalytic converter unit and the engine unit shown in FIG. 10 connect together.

Although in the previously explained preferred embodiment the gasket 59 is provided in the connecting portion where the first exhaust pipe 46 and the second exhaust pipe 47 connect, it is also acceptable to provide a gasket in a connecting portion where other exhaust pipes connect together. For example, it is acceptable to provide a gasket 93 in a connecting portion where a catalytic converter unit 32 and an engine unit 5 connect to each other, as shown in FIG. 10. FIG. 11 is an enlarged view of the connecting portion where an exhaust manifold 31 and a catalyst housing pipe 45 of the catalytic converter unit 32 shown in FIG. 10 connect together. The gasket 93 is arranged between the seal members 91 and 92 and the exhaust passage 16. More specifically, the gasket 93 is arranged in a gap G between an end section 45a of the catalytic converter housing pipe 45 and a step-shaped section 81 provided on the exhaust manifold 31. The seal members 91 and 92 are arranged in recessed sections 83 and 84 located in an internal surface section 82 of the exhaust manifold 31. The seal members 91 and 92 are arranged between the internal surface section 82 of the first opening 33 of the exhaust manifold 31 and an external surface section 45b of the catalyst housing pipe 45. It is also acceptable to provide a gasket 93 at a connecting portion where the catalyst housing pipe 45 and the cylinder block 21 connect, as shown in FIG. 10. It is also acceptable to provide a gasket in a connecting portion between other exhaust pipes not included in the catalytic converter unit 32.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An engine unit comprising:
an exhaust pipe connecting structure including:
a first exhaust pipe;
a second exhaust pipe that is a separate part from the first exhaust pipe, the second exhaust pipe being connected to the first exhaust pipe, the second exhaust pipe defining an exhaust passage together with the first exhaust pipe;
a plurality of seal members between the first exhaust pipe and the second exhaust pipe in a connecting portion where the first exhaust pipe and the second exhaust pipe connect together; and
a heat resistant gasket located in a gap in the connecting portion where the first exhaust pipe and the second exhaust pipe are separated by the gap, the heat resistant gasket being located in the connecting portion between the plurality of seal members and the exhaust passage such that the heat resistant gasket is configured to prevent exhaust gas from reaching any of the plurality of seal members; wherein
a first end of the first exhaust pipe is connected to the engine unit;
a second end of the first exhaust pipe is connected to a first end of the second exhaust pipe; and
a second end of the second exhaust pipe is connected to the engine unit.

2. The engine unit according to claim 1, wherein the first exhaust pipe and the second exhaust pipe are separated by the gap in an axial direction.

3. The engine unit according to claim 2, wherein the gasket is pinched between the first exhaust pipe and the second exhaust pipe in the gap.

4. The engine unit according to claim 1, wherein the plurality of seal members are made of resin.

5. The engine unit according to claim 1, wherein the gasket is made of a ceramic fiber.

6. The engine unit according to claim 1, wherein
the first exhaust pipe includes a first coolant passage between an outside surface and an inside surface of the first exhaust pipe;
the second exhaust pipe includes a second coolant passage between an outside surface and an inside surface of the second exhaust pipe;
the first coolant passage and the second coolant passage communicate with each other at a communication section in the connecting portion where the first exhaust pipe and the second exhaust pipe connect together;
the plurality of seal members includes a first seal member between the communication section and the exhaust passage, and a second seal member provided in the connecting portion where the first exhaust pipe and the second exhaust pipe connect together and between the communication section and an external space outside of the first exhaust pipe and the second exhaust pipe.

7. The engine unit according to claim 6, wherein the first coolant passage and the second coolant passage are configured such that, at the communication section, the coolant flows in a direction intersecting an axial direction of the first exhaust pipe and the second exhaust pipe.

8. The engine unit according to claim 7, wherein the communication section is between the first seal member and the second seal member along the axial direction.

9. The engine unit according to claim 6, wherein the first seal member is closer to a center of the exhaust passage than the second seal member is.

10. The engine unit according to claim 6, wherein
the first exhaust pipe further includes a first external pipe and a first internal pipe inward of the first external pipe, and the first coolant passage is between the first external pipe and the first internal pipe;
the second exhaust pipe further includes a second external pipe and a second internal pipe inward of the second external pipe, and the second coolant passage is between the second external pipe and the second internal pipe;
the first seal member is between the first internal pipe and the second internal pipe; and
the second seal member is between the first external pipe and the second external pipe.

11. The engine unit according to claim 6, wherein the first exhaust pipe and the second exhaust pipe are made of aluminum.

12. The engine unit according to claim 1, wherein
the first exhaust pipe includes a first internal surface section into which an end section of the second exhaust pipe is inserted, a second internal surface section having an internal diameter smaller than an internal diameter of the first internal surface section, and a step-shaped section between the first internal surface section and the second internal surface section;
the step-shaped section of the first exhaust pipe and the end section of the second exhaust pipe are separated by the gap in an axial direction.

13. The engine unit according to claim 1, wherein the gasket has an elastic property.

\* \* \* \* \*